(12) United States Patent
Kanto et al.

(10) Patent No.: US 7,207,595 B2
(45) Date of Patent: Apr. 24, 2007

(54) SIDE AIRBAG APPARATUS

(75) Inventors: Takanori Kanto, Aichi-ken (JP); Satoshi Mabuchi, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 418 days.

(21) Appl. No.: 10/808,486

(22) Filed: Mar. 25, 2004

(65) Prior Publication Data
US 2004/0188989 A1 Sep. 30, 2004

(30) Foreign Application Priority Data
Mar. 27, 2003 (JP) ............................. 2003-089169
Jul. 18, 2003 (JP) ............................. 2003-199408

(51) Int. Cl.
*B60R 21/16* (2006.01)
(52) U.S. Cl. ................. 280/730.2; 280/743.1
(58) Field of Classification Search ............. 280/730.2, 280/743.2, 743.1, 729
See application file for complete search history.

(56) References Cited

U.S. PATENT DOCUMENTS

| 5,566,977 A * | 10/1996 | Wipasuramonton ...... 280/743.1 |
| 5,722,685 A * | 3/1998 | Eyrainer ................... 280/730.2 |
| 5,806,881 A * | 9/1998 | Richter et al. ........... 280/730.2 |
| 2002/0096869 A1* | 7/2002 | Kai et al. .................... 280/735 |
| 2003/0011176 A1* | 1/2003 | Vendely et al. .......... 280/730.2 |
| 2003/0168836 A1* | 9/2003 | Sato et al. ............... 280/730.2 |

FOREIGN PATENT DOCUMENTS

| DE | 196 05 620 A1 * | 8/1997 |
| JP | 3013763 U * | 5/1995 |
| JP | A-H10-67297 | 3/1998 |
| JP | 11-180244 A * | 7/1999 |
| JP | A-2002-362295 | 12/2002 |

* cited by examiner

*Primary Examiner*—Ruth Ilan
(74) *Attorney, Agent, or Firm*—Posz Law Group, PLC

(57) ABSTRACT

A side airbag apparatus includes an airbag, an inflator and a limited thickness portion. The inflator supplies gas to the airbag. When the airbag is inflated and deployed, the limited thickness portion limits the inflation of the airbag such that the thickness of a portion of the airbag corresponding to an elbow portion of an occupant on the seat is less than the thickness of the remainder of the airbag with respect to the measurement between the occupant and the body side portion. The airbag includes an inflation portion that entirely surrounds the limited thickness portion and is inflated with gas from the inflator. This prevents an elbow portion of the occupant from receiving an excessive force directed laterally inward.

14 Claims, 7 Drawing Sheets

SIDE AIRBAG APPARATUS

BACKGROUND OF THE INVENTION

The present invention relates to a side airbag apparatus that, when an impact equal to or greater than a predetermined value is applied to a vehicle body, is inflated and deployed between a sidewall of the vehicle body and an occupant seated on a seat of the vehicle.

Japanese Laid-Open Patent Publication No. 2002-362295 and Japanese Patent No. 2933894 disclose typical side airbag apparatuses. Such a side airbag apparatus, which is shown in FIG. 12, is typically embedded in a backrest 15 coupled to a seat portion 14 of a car seat 12. Specifically, the side airbag apparatus is embedded in a side of the backrest 15 that faces the outside of the vehicle. At a collision, the side airbag apparatus inflates and deploys an airbag 31 from the side of the backrest 15 and along a sidewall of the vehicle body, or between a door 16 and an occupant P.

When the inflation and deployment of the airbag 31 are completed, a portion of the airbag 31 that corresponds to an elbow portion Pe of the occupant P has a relatively large measurement along the lateral direction of the vehicle. Therefore, the airbag 31 excessively push the elbow portion Pe laterally inward. That is, an upper arm of the occupant P is excessively pivoted about the shoulder by the airbag 31. Accordingly, an excessive force is applied the chest of the occupant P.

SUMMARY OF THE INVENTION

The present invention was made for solving the above problems in the prior art.

Accordingly, it is an objective of the present invention to provide a side airbag apparatus that, when its airbag is inflated and deployed between an occupant seated on a seat and a sidewall of a vehicle body, prevents an elbow portion of the occupant from receiving an excessive force directed laterally inward, thereby preventing reliably protecting the chest of the occupant.

To attain the above object, the present invention provides a side airbag apparatus used in a vehicle. The side airbag apparatus includes an airbag, an inflator and a limited thickness portion. The inflator supplies gas to the airbag, thereby inflating and deploying the airbag between a body side portion of the vehicle and a seat located in the passenger compartment of the vehicle. When the airbag is inflated and deployed, the limited thickness portion limits the inflation of the airbag such that the thickness of a portion of the airbag corresponding to an elbow portion of an occupant on the seat is less than the thickness of the remainder of the airbag with respect to the measurement between the occupant and the body side portion. The airbag includes an inflation portion that entirely surrounds the limited thickness portion and is inflated with gas from the inflator.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A side airbag apparatus 17 according to one embodiment of the present invention will now be described with reference to FIGS. 1 to 4.

Figure 1:
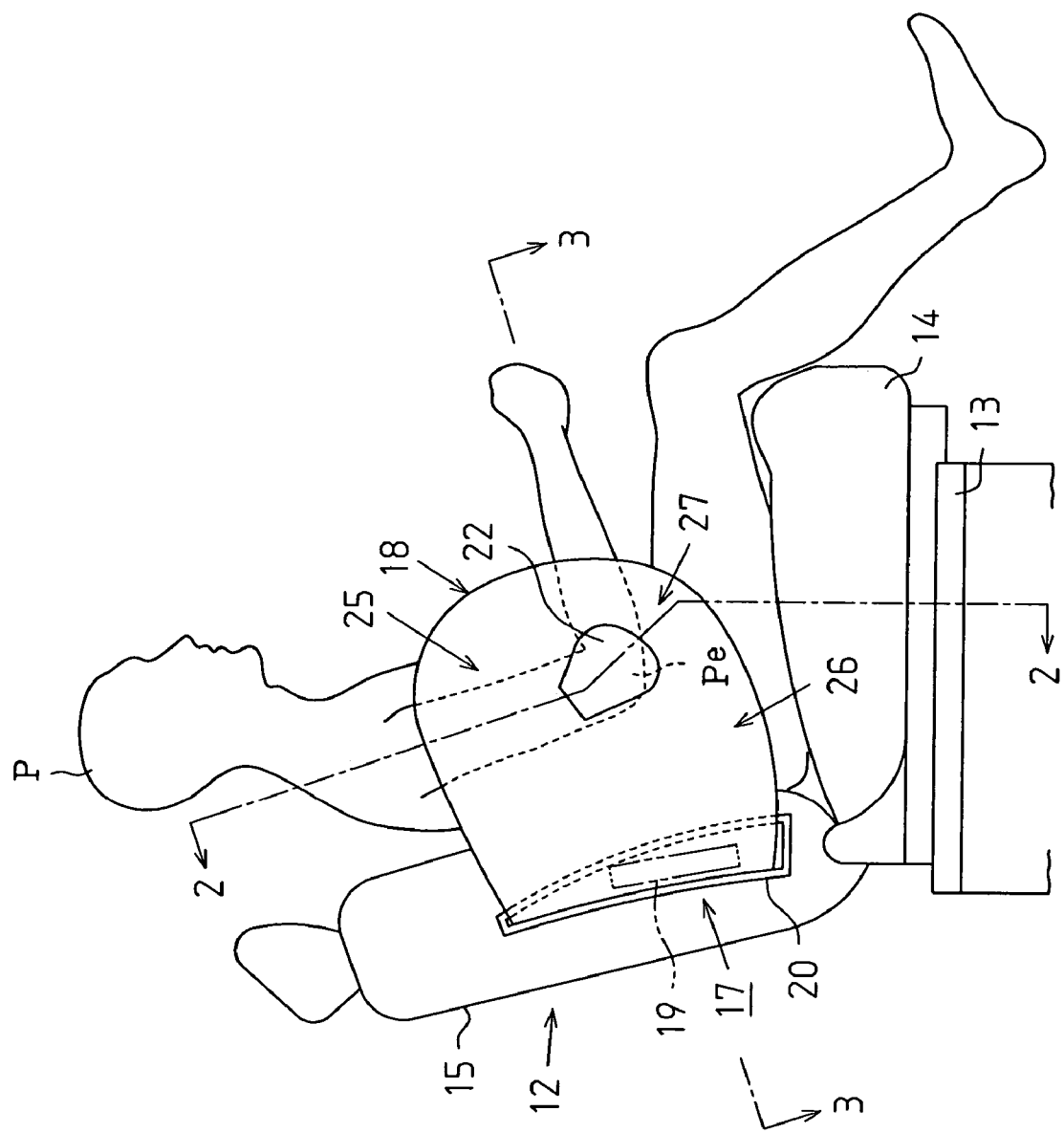
FIG. 1 is a side view illustrating a car seat in which an airbag apparatus according to one embodiment is embedded, and an inflated and deployed airbag.
Figure 2:
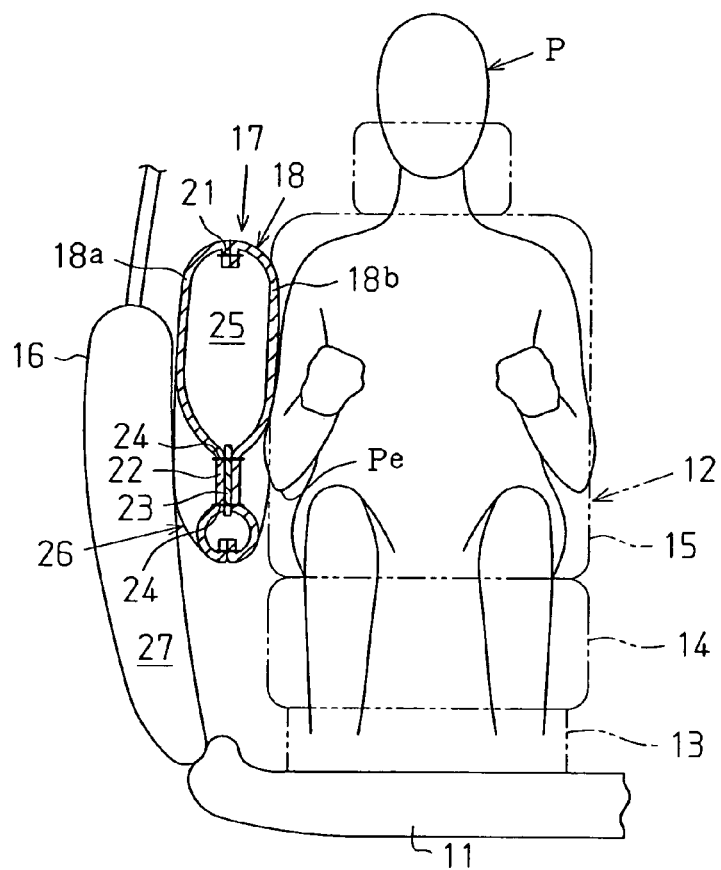
FIG. 2 is a cross-sectional view taken along line 2—2 of FIG. 1.

FIG. 1 shows a side of a car seat 12, and FIG. 2 is a cross-sectional view taken along line 2—2 of FIG. 1. As shown in FIG. 2, the car seat 12, on which an occupant P is seated, is provided on a bottom 11 of the vehicle body. The car seat 12 includes a seat portion 14 and a backrest 15. The seat portion 14 is attached to the bottom 11 with a position adjusting mechanism 13 in between. The position adjusting mechanism 13 is used to adjust the position of the seat portion 14 along the longitudinal direction of the vehicle. The backrest 15 is attached to the rear end of the seat portion 14. The side airbag apparatus 17 is installed in the backrest 15.

The configuration of the side airbag apparatus 17 installed in the backrest 15 will now be described.

Figure 4:
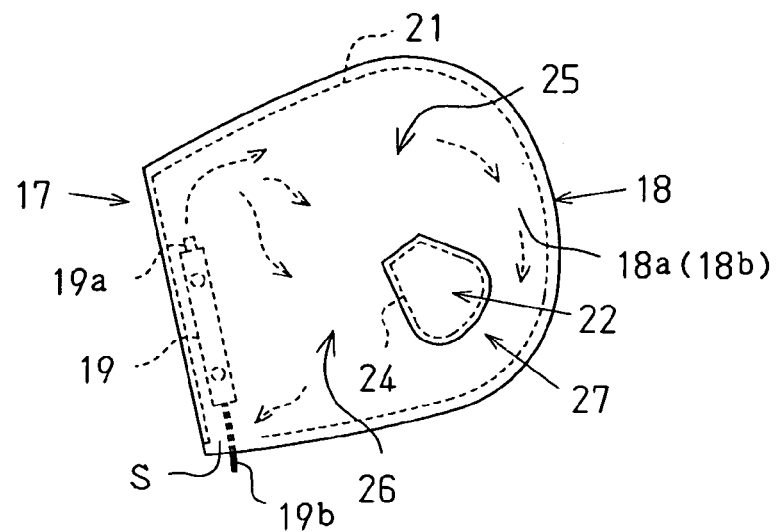
FIG. 4 is a front view showing the deployed airbag.

As shown in FIG. 4, the side airbag apparatus 17 includes an airbag 18, an inflator 19, and a case 20. The airbag 18 is formed by sewing a pair of fire-proof woven fabric sheets 18a, 18b. The inflator 19 is provided in the airbag 18 and functions as a gas generator. The case 20 accommodates the airbag 18 and the inflator 19. As shown in FIG. 1, the case 20 is attached to a frame (not shown) of the backrest 15 of the car seat 12 and is embedded in a side of the backrest 15 that faces a sidewall of the vehicle body, or a door 16.

A sensor (not shown) for detecting a lateral impact applied to the door 16 is provided in the door 16. The impact sensor is connected to the inflator 19 with a control circuit (not shown).

The airbag 18 will now described in detail.

The airbag 18 is folded and accommodated in the case 20. FIGS. 1 and 4 show the inflated and deployed state of the airbag 18. The airbag 18 is designed to be inflated and deployed frontward into a space between the occupant P seated on the seat portion 12 and the door 16.

The outer peripheral portions of the fabric sheets 18a, 18b forming the airbag 18 are connected to each other with a sewing thread 21. The inflator 19 has a nozzle 19a. Gas injected by the injector 19 through the nozzle 19a is supplied to the interior of the airbag 18 through paths indicated by arrows of broken lines in FIG. 4 to inflate and deploy the airbag 18. As shown in FIG. 1, the airbag 18 has a dent portion 22, or a limited thickness portion. The dent portion 22 corresponds to an elbow portion Pe of the occupant P, which is a joint between an upper arm and a lower arm. The entire area of the dent portion 22 is located within the outer periphery of the airbag 18 and is entirely surrounded by an inflation portion, which will be discussed below. As viewed from the side, the dent portion 22 has a substantially arcuate shape. As shown in FIG. 2, the dent portion 22 is formed flat by sewing the fabric sheets 18a, 18b with a reinforcing fabric sheet 23 in between with the sewing thread 24.

Figure 3:
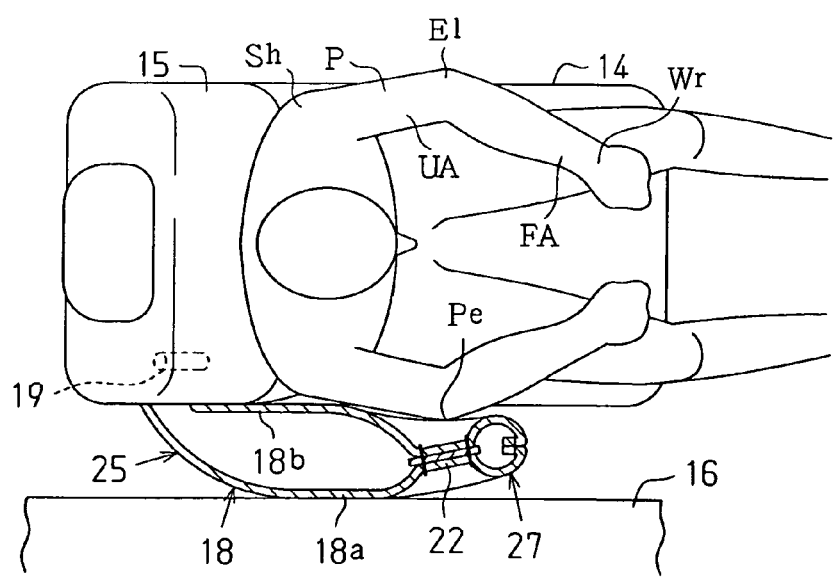
FIG. 3 is a cross-sectional view taken along line 3—3 of FIG. 1.

As shown in FIG. 3, the elbow portion Pe does not represent only an elbow El of the occupant P, but represents a portion including the elbow El and parts adjacent to the elbow El. The parts adjacent to the elbow El include an upper arm UA (part between a shoulder Sh and the elbow El) and a forearm FA (part between the elbow El and a wrist Wr). Particularly, the parts adjacent to the elbow El include a lower part of the upper arm UA (part between the elbow El and the midpoint between the shoulder Sh and the elbow El) and an upper part of the forearm FA (lower arm, part between the elbow El and the midpoint between the wrist Wr and the elbow El).

The airbag 18 has a chest protecting portion 25 located above the dent portion 22. The airbag 18 also has a lumbar region protecting portion 26 located below and rearward of the dent portion 22. Further, the airbag 18 has a narrow portion 27 located below and frontward of the dent portion 22. The narrow portion 27, together with the dent portion 22, protects the elbow portion Pe. As shown in FIGS. 2 and 3, the chest protecting portion 25 and the lumbar region protecting portion 26 have a greater thickness than that of the narrow portion 27. As viewed from the side, the narrow portion 27 is formed as an arc that corresponds to a quarter circle and has a constant width.

In this embodiment, the chest protecting portion 25, the lumbar region protecting portion 26, and the narrow portion 27 form the inflation portion that entirely surrounds the dent portion 22.

A harness 19b is connected to the lower end of the inflator 19. The harness 19b is drawn out of the airbag 18 through an opening S, at which the fabric sheets 18a, 18b are not sewn to each other with the sewing thread 21. The opening S also functions as a vent hole for discharging gas to the exterior after the airbag 18 is inflated and deployed.

The above described side airbag apparatus 17 operates in the following manner. When a sensor in the door 16 detects an impact equal to or greater than a predetermined value, the control circuit outputs an actuation signal to the inflator 19. Based on the actuation signal, the inflator 19 instantly injects gas to the interior of the airbag 18. The gas inflates and deploys the airbag 18 frontward as shown in FIGS. 1 and 3 into the space between the door 16 and the occupant P so that the chest protecting portion 25, the lumbar region protecting portion 26, and the narrow portion 27 protect the occupant P. The gas in the inflated airbag 18 is discharged through the opening S, which functions as a vent hole. Accordingly, the airbag 18 is deflated.

This embodiment has the following advantages.

(1) As shown in FIGS. 1 to 3, when the airbag 18 is inflated and deployed between the door 16 and the occupant P, the dent portion 22 corresponds to the elbow portion Pe of the occupant P. Therefore, the dent portion 22, which contacts the elbow portion Pe, prevents the elbow portion Pe from excessively moved laterally inward, thereby preventing the chest of the occupant is excessively pressed with the elbow portion. The occupant is therefore properly protected.

(2) The side airbag apparatus 17 has the narrow portion 27 located frontward of and below the dent portion 22. The narrow portion 27 prevents the dent portion 22 from being bent and thus stabilize the orientation of the dent portion 22. Therefore, the occupant is appropriately protected.

(3) The narrow portion 27 of the airbag 18 is shaped as an arc of a quarter circle having a constant width as viewed from the side. Therefore, gas is smoothly guided to the narrow portion 27, and the narrow portion 27 is prevented from being bent. Accordingly, the inflation and deployment of the narrow portion 27 is reliably performed to protect the occupant.

(4) In the side airbag apparatus 17, the reinforcing fabric sheet 23 is provided between the fabric sheets 18a, 18b, and the sheets 23, 18a, 18b are sewn together with the thread 24 to form the dent portion 22 having a triple sheet structure. This increases the disruptive strength of the dent portion 22 during inflation and deployment of the airbag 18.

It should be apparent to those skilled in the art that the present invention may be embodied in many other specific forms without departing from the spirit or scope of the invention. Particularly, it should be understood that the invention may be embodied in the following forms.

Figure 5:
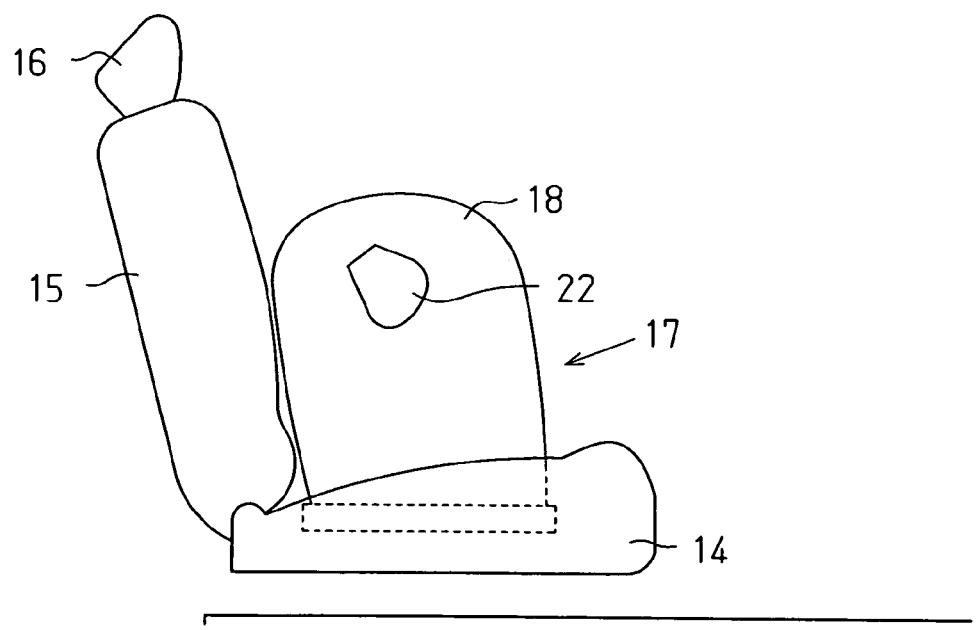
FIG. 5 is a side view illustrating a seat in which an airbag according to another embodiment of the present invention is embedded.

As shown in FIG. 5, the side airbag apparatus 17 may be provided in the seat portion 14. Alternatively, not illustrated, the side airbag apparatus 17 may be provided in a sidewall of the vehicle body. In these cases, an elbow portion of an occupant is prevented from being excessively pressed, and the chest of the occupant is appropriately protected.

Figure 6:
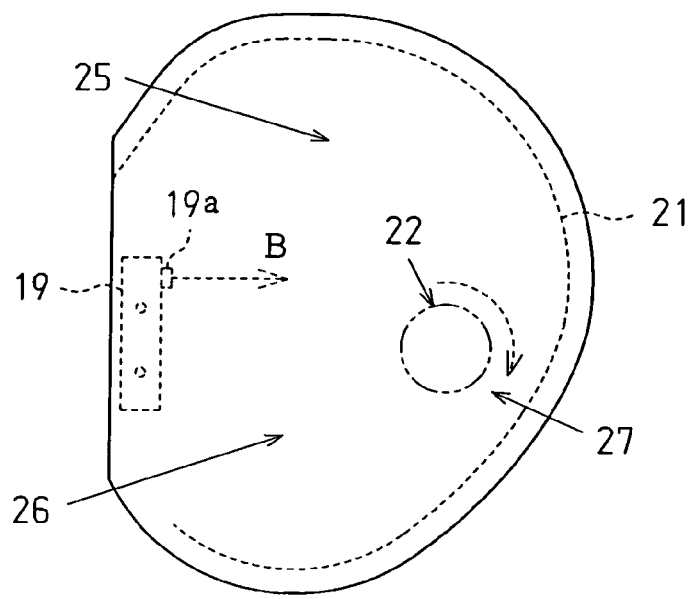
FIG. 6 is a side view illustrating an airbag according to another embodiment of the present invention.

As shown in FIG. 6, the side airbag apparatus 17 may be modified such that the dent portion 22 may be formed circular, and gas injected from the nozzle 19a of the inflator 19 passes through an area above the dent portion 22. In other words, the dent portion 22 may be displaced downward relative to a gas flow direction B of the gas injected from the nozzle 19a.

In this case, the flow of gas injected through the nozzle 19a does not collide with the dent portion 22. This accelerates the provision of gas to the narrow portion 27 and thus accelerates the inflation and deployment of the narrow portion 27.

Also, the circular shape of the dent portion 22 accelerates the provision of gas to the narrow portion 27. This stabilizes the deployment speed (period to a complete inflation) and deployment behavior.

In the modified embodiment of FIG. 6, the position of the nozzle 19a may be lowered so that the dent portion 22 is located higher than the gas flow direction B.

Figure 7:
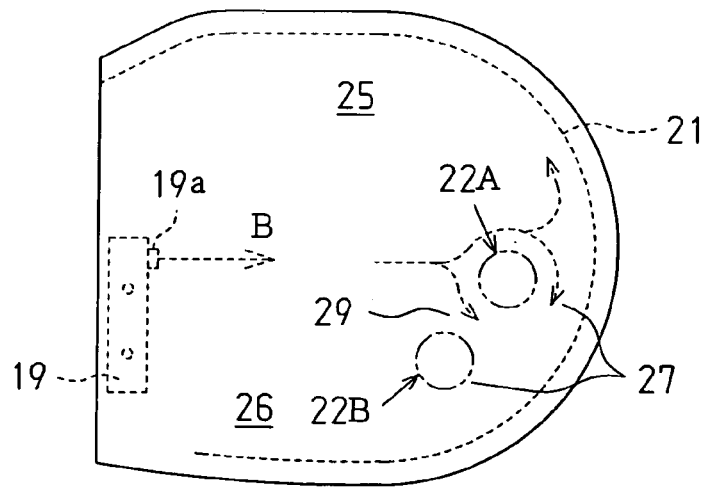
FIG. 7 is a side view illustrating an airbag according to another embodiment of the present invention.

As shown in FIG. 7, an outer circular dent portion 22A and a lower dent portion 22B may be provided such that a gas passage 29 is formed between the dent portions 22A and 22B. In this case, even if the main gas flow B collides with the upper dent portion 22A, the gas passage 29 permits the gas to advance to the narrow portion 27. This permits the airbag to be smoothly inflated and deployed.

By changing the sizes of and the distance between the outer and lower dent portions 22A and 22B, the thickness of the dent portions 22A, 22B can be easily adjusted.

In the modified embodiment of FIG. 7, the gas flow B may be directed toward the gas passage 29 between the outer dent portion 22A and the lower dent portion 22B.

Figure 8:
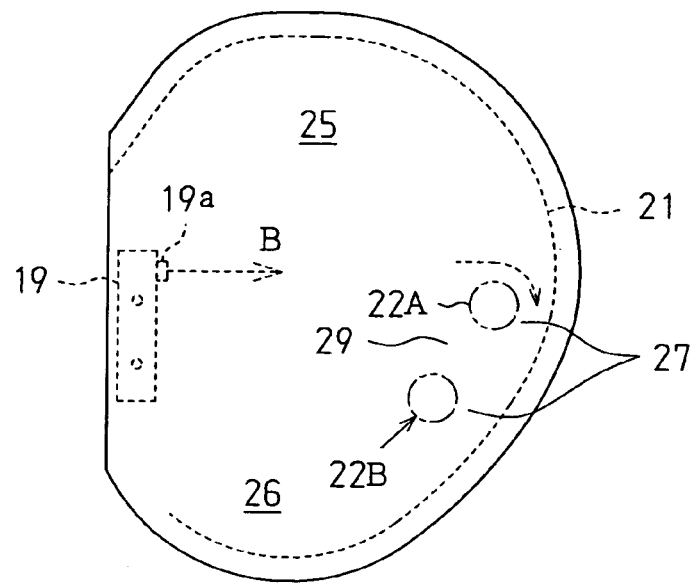
FIG. 8 is a side view illustrating an airbag according to another embodiment of the present invention.

As shown in FIG. 8, the gas flow B from the nozzle 19a of the inflator 19 may be directed to an area directly above the upper dent portion 22A. In this case, compared to the modified embodiment shown in FIG. 7, gas is more quickly supplied to the narrow portion 27. That is, the narrow portion 27 is reliably inflated and deployed.

Figure 9:
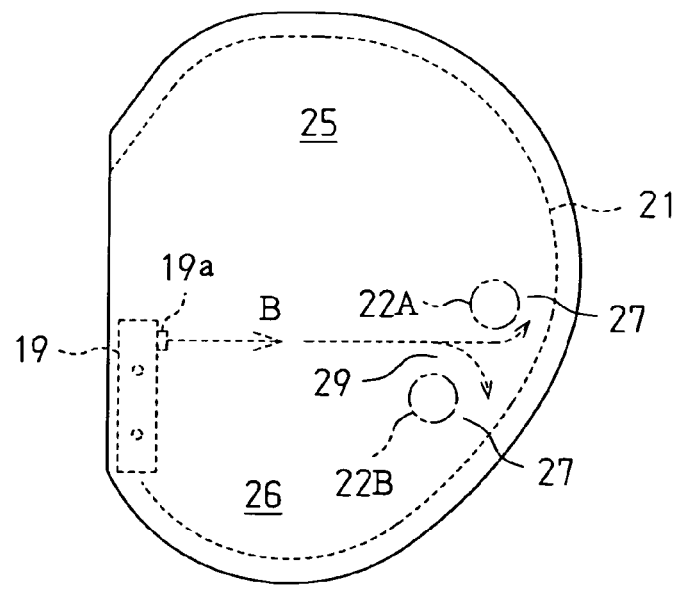
FIG. 9 is a side view illustrating an airbag according to another embodiment of the present invention.

As shown in FIG. 9, the position of the inflator 19 may be lowered in the airbag 18 so that the main gas flow B from the nozzle 19a is directed to the gas passage 29 between the upper and lower dent portions 22A and 22B. This modified embodiment permits gas to be quickly supplied to the narrow portion 27 through the passage 29.

Figure 10:
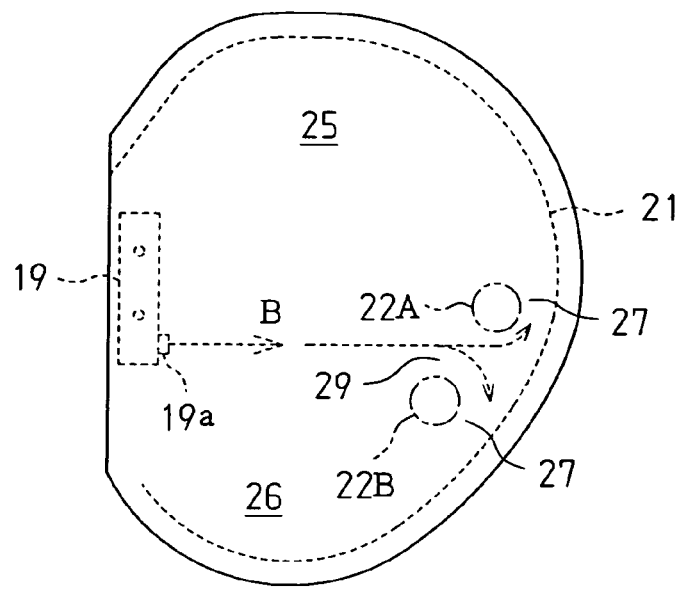
FIG. 10 is a side view illustrating an airbag according to another embodiment of the present invention.

As shown in FIG. 10, the inflator 19 may be turned upside down so that the nozzle 19a is located at the lower side and the main gas flow B directed to the passage 29.

Figure 11:
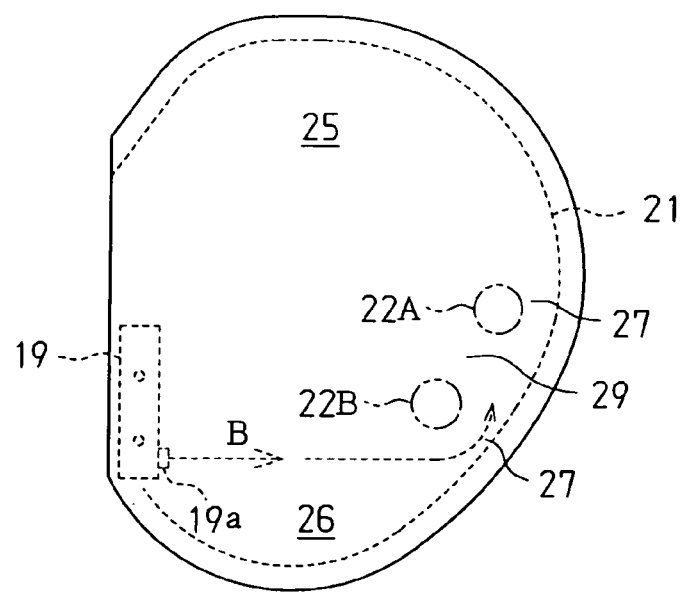
FIG. 11 is a side view illustrating an airbag according to another embodiment of the present invention.
Figure 12:
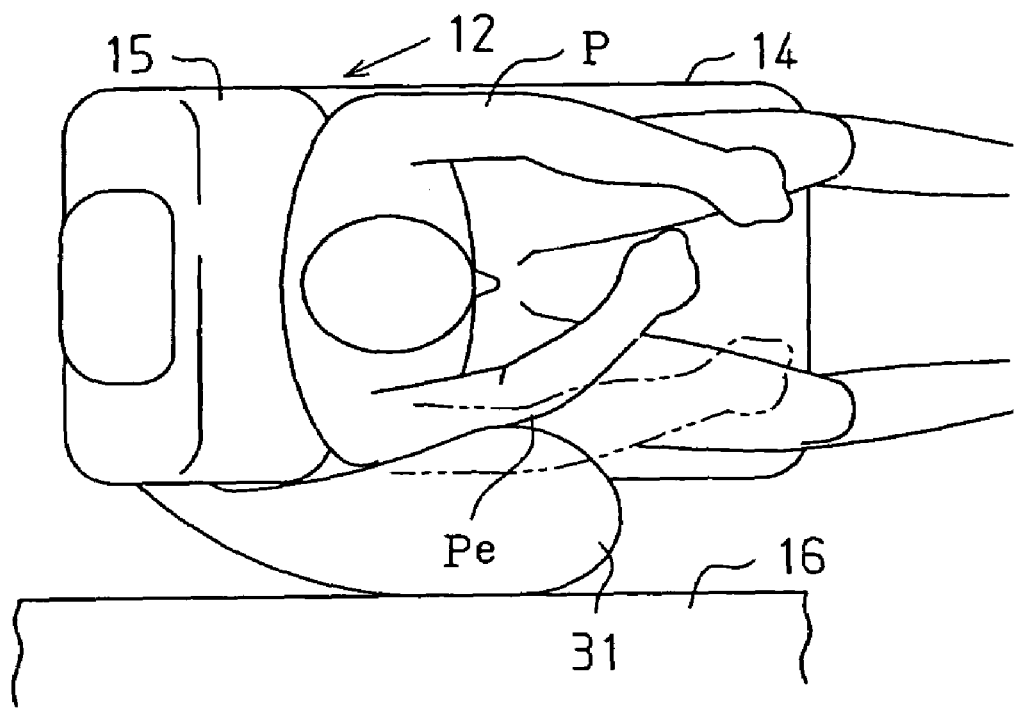
FIG. 12 is a plan view showing a prior art side airbag apparatus installed in the backrest of a car seat, when the airbag is inflated and deployed.

As shown in FIG. 11, the gas flow B from the nozzle 19a may be directed to an area below the lower dent portion 22B.

A predetermined space may be provided inside the dent portion 22 to permit gas flow.

In the illustrated embodiments, the case 20 may be omitted if the airbag 18 is accommodated, and inflated and deployed in a desirable manner.

In the illustrated embodiment, the inflator 19 is embedded in a side of the backrest 15 of the seat 12 that corresponds to the door 16. However, the inflator 19 may be located elsewhere as long as the inflator 19 is capable of injecting gas into the airbag 18.

In the illustrated embodiments, the dent portion 22 is formed substantially arcuate or circular. However, as long as the gas flow is taken into consideration, the shape of the dent portion 22 may be changed. For example, the dent portion 22 may be elliptic, triangular, square, trapezoidal. Alternatively, the dent portion 22 may be shaped like an elbow portion. Three or more dent portions 22 may be provided.

The fabric sheets 18a, 18b forming the airbag 18 may be locally coupled to each other to form the dent portion 22.

In the illustrated embodiment, the present invention is applied to the airbag 18 to protect the lumbar region and chest of an occupant. However, the present invention may be applied to an airbag for protecting a shoulder of an occupant as well as the lumbar region and the chest. The present invention also may be applied to an airbag for protecting the lumbar region, the chest, the shoulders, and the head of an occupant.

Therefore, the present examples and embodiments are to be considered as illustrative and not restrictive and the invention is not to be limited to the details given herein, but may be modified within the scope and equivalence of the appended claims.

The invention claimed is:

1. A side airbag apparatus used in a vehicle, comprising:
   an airbag;
   an inflator, wherein the inflator supplies gas to the airbag, thereby inflating and deploying the airbag between a body side portion of the vehicle and a seat located in the passenger compartment of the vehicle; and
   a limited thickness portion, wherein, when The airbag is inflated and deployed, the limited thickness portion limits the inflation of the airbag such that the thickness of a portion of the airbag is less than the thickness of the remainder of the airbag with respect to the measurement between the occupant and the body side portion, and wherein the airbag includes an inflation portion that entirely surrounds the limited thickness portion and is inflated with gas from the inflator,
   wherein the airbag is provided in a part of a backrest of the seat that faces the side body portion, wherein the airbag is deployed frontward in a traveling direction of the vehicle and is inflated in a space between the body side portion and an occupant for protecting at least the lumbar region and the chest of the occupant.
   wherein the inflation portion includes a narrow portion, wherein, when the airbag is deployed, the narrow portion is located below the limited thickness portion and frontward in the traveling direction of the vehicle with respect to the limited thickness portion, and wherein the narrow portion is arcuate as viewed from a side of the vehicle and has a substantially constant width.

2. The side airbag apparatus according to claim 1, wherein the limited thickness portion is formed by sewing facing portions of the airbag to each other with a reinforcing fabric sheet in between.

3. The side airbag apparatus according to claim 1, wherein the limited thickness portion is one of a plurality of limited thickness portions, wherein the airbag has a gas passage located between an adjacent pair of the limited thickness portions.

4. The side airbag apparatus according to claim 1, wherein the limited thickness portion is circular.

5. The side airbag apparatus according to claim 1, wherein the limited thickness portion is located at a position that is outside a mainstream of gas injected by the inflator.

6. The side airbag apparatus according to claim 5, wherein the inflator injects gas in a horizontal direction.

7. The side airbag apparatus according to claim 6, wherein the limited thickness portion is located above or below a mainstream of gas injected by the inflator.

8. A side airbag apparatus used in a vehicle, comprising:
   an airbag;
   an inflator, wherein the inflator supplies gas to the airbag, thereby inflating and deploying the airbag between a body side portion, of the vehicle and a seat located in the passenger compartment of the vehicle; and
   a limited thickness portion, wherein, when the airbag is inflated and deployed, the limited thickness portion limits the inflation of the airbag such that the thickness of a portion of the airbag is less than the thickness of the remainder of the airbag with respect to the measurement between the occupant and the body side portion, and wherein the airbag includes an inflation portion that entirely surrounds the limited thickness portion and is inflated with gas from the inflator, and wherein the inflation portion has a chest protecting portion for protecting the chest of an occupant, a lumbar region protecting portion for protecting the lumbar region of an occupant, and a narrow portion for, together with the limited thickness portion, protecting the elbow portion of an occupant,
   wherein, when the airbag is deployed, the narrow portion is located below the limited thickness portion and frontward in the traveling direction of the vehicle with respect to the limited thickness portion, and
   wherein the narrow portion is arcuate as viewed from a side of the vehicle and has a substantially constant width.

9. The side airbag apparatus according to claim 8, wherein the airbag is provided in a part of a backrest of the seat that faces the side body portion, wherein the airbag is deployed frontward in a traveling direction of the vehicle and is inflated in a space between the body side portion and an occupant.

10. The side airbag apparatus according to claim 8, wherein the airbag is provided in a part of a seat portion of the seat that faces the side body portion, and wherein the airbag is deployed upward in the passenger compartment and is inflated in a space between the body side portion and an occupant.

11. The side airbag apparatus according to claim 8, wherein the limited thickness portion is formed by sewing facing portions of the airbag to each other with a reinforcing fabric sheet in between.

12. The side airbag apparatus according to claim 8, wherein the limited thickness portion is one of a plurality of limited thickness portions, wherein the airbag has a gas passage located between an adjacent pair of the limited thickness portions.

13. The side airbag apparatus according to claim 8, wherein the limited thickness portion is circular.

14. The side airbag apparatus according to claim 8, wherein the inflator injects gas in a horizontal direction, and wherein the limited thickness portion is located above or below a mainstream of gas injected by the inflator.

* * * * *